(12) United States Patent
Ogura

(10) Patent No.: US 8,208,607 B2
(45) Date of Patent: Jun. 26, 2012

(54) DEVICE, METHOD AND COMPUTER READABLE MEDIUM FOR RECORDED DATA MANAGEMENT

(75) Inventor: Kanae Ogura, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 682 days.

(21) Appl. No.: 12/413,541

(22) Filed: Mar. 28, 2009

(65) Prior Publication Data
US 2009/0245480 A1    Oct. 1, 2009

(30) Foreign Application Priority Data

Mar. 28, 2008    (JP) .................................. 2008-088069

(51) Int. Cl.
*H04M 1/64*    (2006.01)
(52) U.S. Cl. ....................... 379/77; 379/88.24
(58) Field of Classification Search .................. 379/67.1, 379/68, 74, 77, 85, 88.08, 88.16, 88.22, 88.23, 379/88.24, 88.25, 93.21, 158, 202.01
See application file for complete search history.

(56) References Cited

U.S. PATENT DOCUMENTS

| | | | | |
|---|---|---|---|---|
| 5,526,407 A * | 6/1996 | Russell et al. | ............. | 379/88.01 |
| 5,943,402 A * | 8/1999 | Hamel et al. | ............... | 379/88.26 |
| 5,995,824 A * | 11/1999 | Whitfield | .................... | 455/412.1 |
| 6,222,909 B1 * | 4/2001 | Qua et al. | .................... | 379/88.22 |
| 6,785,367 B2 * | 8/2004 | Horvath et al. | ............ | 379/88.04 |
| 6,876,729 B1 * | 4/2005 | Kuter et al. | ................ | 379/88.22 |
| 7,869,579 B2 * | 1/2011 | Kwon | ........................ | 379/88.17 |
| 2002/0110226 A1* | 8/2002 | Kovales et al. | ............ | 379/88.17 |
| 2011/0043597 A1* | 2/2011 | Greenwood et al. | ....... | 348/14.08 |

FOREIGN PATENT DOCUMENTS

| | | |
|---|---|---|
| JP | 2001-231059 A | 8/2001 |
| JP | 2007-306340 A | 11/2007 |

* cited by examiner

*Primary Examiner* — Olisa Anwah
(74) *Attorney, Agent, or Firm* — Baker Botts L.L.P.

(57) ABSTRACT

There is provided a device for managing recorded data, comprising: a recording unit configured to record a telephone communication; a designation unit configured to designate a time delimiting point to be set to recorded data being recorded by the recording unit; a receiving unit configured to receive a signal indicating a time delimiting point from an external device of a party on the other side; a setting unit configured to set the designated time delimiting point designated through the designation unit and the received time delimiting point received from the external device to the recorded data.

20 Claims, 4 Drawing Sheets

DATABSE

| PHONE NUMBER | DATA NAME | TITLE | DELIMITING POINT | KEYWORD |
|---|---|---|---|---|
| TEL_1 | DATA_1 | TITLE_1 | TIME_1 | KWD_1 |
| | | | TIME_2 | KWD_2 |
| | | | TIME_3 | KWD_3 |
| TEL_2 | DATA_2 | TITLE_2 | TIME_4 | KWD_4 |
| | | | TIME_5 | KWD_5 |
| | | | TIME_6 | KWD_6 |
| ⋮ | ⋮ | ⋮ | ⋮ | ⋮ |

FIG. 2

DEVICE, METHOD AND COMPUTER READABLE MEDIUM FOR RECORDED DATA MANAGEMENT

CROSS-REFERENCE TO RELATED APPLICATION

This application claims priority under 35 U.S.C. §119 from Japanese Patent Application No. 2008-088069, filed on Mar. 28, 2008. The entire subject matter of the application is incorporated herein by reference.

BACKGROUND

1. Technical Field

Aspects of the present invention relate to a device for managing recorded data.

2. Related Art

Devices capable of recording telephone conversation and managing recorded data have been widely used. Hereafter, such a device is frequently referred to as a recorded data management device. It is preferable to set a time delimiting point for each topic in the telephone conversation for management of recorded data. The term "time delimiting point" means identification for identifying a part of the recorded data (partial recorded data). In other words, the time delimiting point is an identification mark for finding the beginning of the partial recorded data.

Japanese Patent Provisional Publication No. 2007-306340A (hereafter, referred to as JP2007-306340A) discloses a telephone device capable of recording telephone conversation and setting an identification mark to part of recorded data of one telephone conversation. The telephone device disclosed in JP2007-306340A stores a part of a telephone conversation with the party on the other side and identification information for identifying a partial period in an entire telephone conversation from the other parts in the entire telephone conversation.

SUMMARY

Aspects of the present invention are advantageous in that a recorded data management device capable of recording a telephone communication and managing the recorded data such that both of a user of the recorded data management device and a user of a device on the other side are able to easily manage the recorded data is provided.

According to an aspect of the invention, there is provided a device for managing recorded data, comprising: a recording unit configured to record a telephone communication; a designation unit configured to designate a time delimiting point to be set to recorded data being recorded by the recording unit; a receiving unit configured to receive a signal indicating a time delimiting point from an external device of a party on the other side; a setting unit configured to set the designated time delimiting point designated through the designation unit and the received time delimiting point received from the external device to the recorded data.

Such a configuration makes it possible to store the recorded data such that both of a user of the recorded data management device and a user of the external device (i.e., the party on the other side) are able to easily manage the recorded data.

According to another aspect of the invention, there is provided a method to be implemented on a device for managing recorded data, comprising the steps of: recording a telephone communication; designating a time delimiting point to be set to recorded data being recorded; receiving a signal indicating a time delimiting point from an external device of a party on the other side; and setting the designated time delimiting point and the received time delimiting point received from the external device to the recorded data.

Such a configuration makes it possible to store the recorded data such that both of a user of the recorded data management device and a user of the external device (i.e., the party on the other side) are able to easily manage the recorded data.

According to another aspect of the invention, there is provided a computer readable medium having computer readable instruction stored thereon, which, when executed by a processor of a device for managing recorded data, configures the processor to perform the steps of: recording a telephone communication; designating a time delimiting point to be set to recorded data being recorded; receiving a signal indicating a time delimiting point from an external device of a party on the other side; setting the designated time delimiting point and the received time delimiting point received from the external device to the recorded data.

Such a configuration makes it possible to store the recorded data such that both of a user of the recorded data management device and a user of the external device (i.e., the party on the other side) are able to easily manage the recorded data.

According to another aspect of the invention, there is provided, in combination, a first device and a second device. The first device comprises: a designation unit configured to designate a time delimiting point; and a transmission unit configured to transmit a signal indicating the designated time delimiting point to the second device. The second device comprises: a recording unit configured to record a telephone communication with the first device; a second designation unit configured to designate a time delimiting point to be set to recorded data being recorded by the recording unit; a receiving unit configured to receive the signal from the first device; and a setting unit configured to set the designated time delimiting point designated through the second designation unit and the received time delimiting point received from the first device to the recorded data.

Such a configuration makes it possible to store the recorded data such that both of a user of the second device and a user of the first device (i.e., the party on the other side) are able to easily manage the recorded data.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 2 illustrates an example of a data structure of a database stored in the multifunction device.

DETAILED DESCRIPTION

Hereafter, an embodiment according to the invention will be described with reference to the accompanying drawings.

Figure 1:
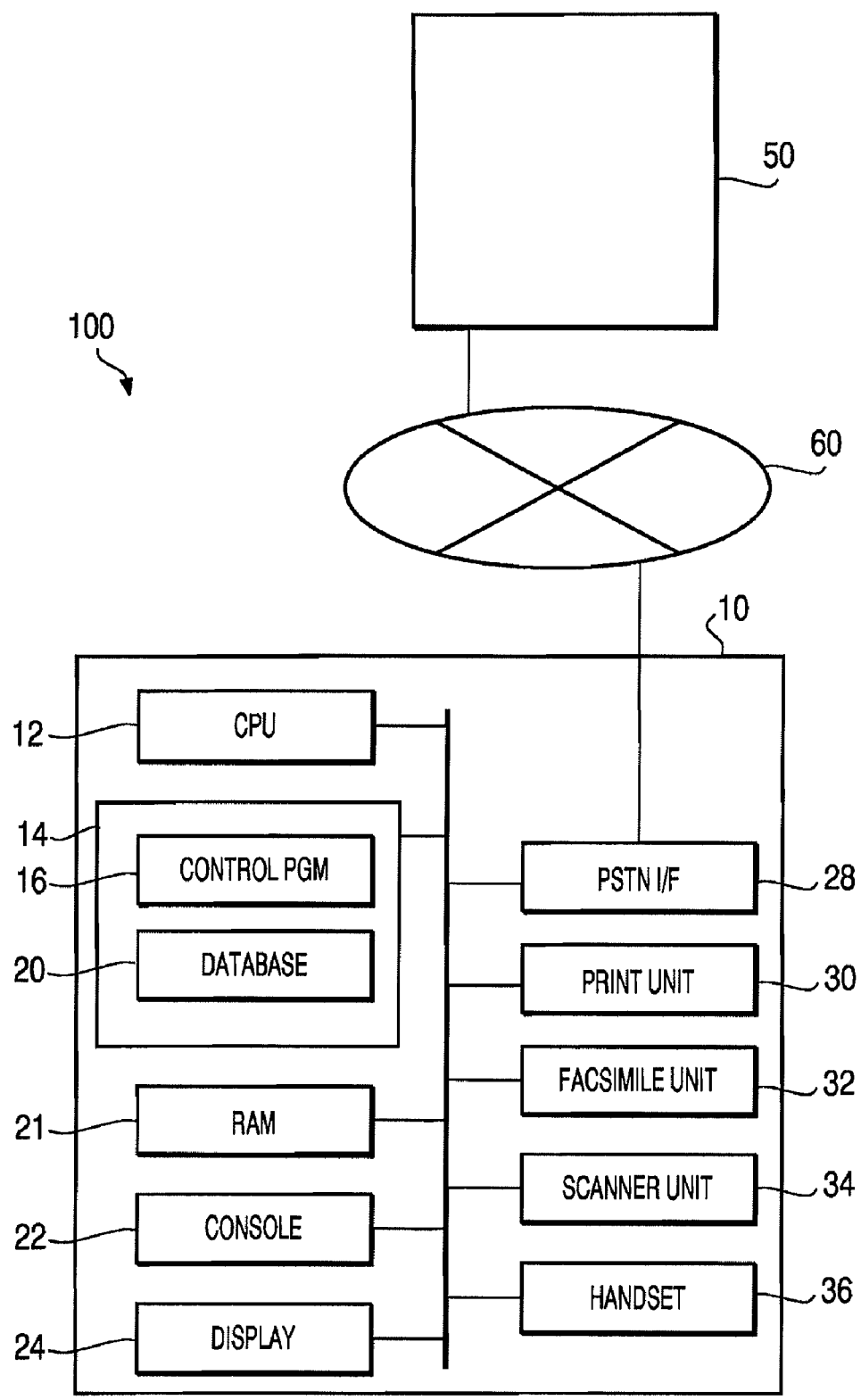
FIG. 1 illustrates a system configuration of a system for managing telephone communication and a block diagram of a multi function device.

FIG. 1 illustrates a system configuration. In FIG. 1, a block diagram of an MFD (Multi-Function Device) 10 according to an embodiment is illustrated. In FIG. 1, another MFD 50 to which the MFD 10 is connected via a public network 60 is also illustrated.

As shown in FIG. 1, the MFD 10 includes a CPU 12, a storage unit 14, a RAM 21, a console 22, a display 24, a PSTN (Public Switched Telephone Networks) interface 28, a print unit 30, a facsimile unit 32, a scanner unit 34, and a handset 36. In FIG. 1, "I/F" means an interface, and "PGM" means a program.

The CPU 12 controls the functions of the MFD 10 in accordance with a control program 16 stored in the storage unit 14. Processes executed on the MFD 10 are based on the control program 16. The storage unit 14 also stores a database 20. The CPU 12 uses the RAM 21 to temporarily stores data to be transmitted or received data.

The console 22 is a hardware unit configured to accept user operations. The PSTN interface 28 is a hardware unit configured to interface the MFD 10 with the MFD 50 via the public network 60. Therefore, the MFD 10 is able to establish a connection with the MFD 50 via the public network 60. That is, two users of the MFDs 10 and 50 (i.e., a user of the MFD 10 and a user of the MFD 50) are able to perform communication (e.g., telephone communication) with each other.

The handset 36 is a hardware unit to perform telephone communication with the user of the MFD 50. The handset 36 accommodates a microphone and a speaker (not shown). The MFD 10 is also able to communicate with another MFD or a terminal via the Internet (not shown).

The print unit 30 is a hardware unit to execute the print function. The facsimile unit 32 is a hardware unit to execute the facsimile function. The scanner unit 34 is a hardware unit to execute the scanner function (i.e., the image reading function).

Since the MFD 50 has the same configuration as that of the MFD 10, explanations of the configuration of the MFD 50 will not be repeated. In the following, the system in which the MFD 10 and the MFD 50 are connected with each other via the public network 60 is referred to as a system 100.

The MFD 10 has a fiction of recording telephone communication and managing the recorded telephone communication. The recorded data is stored in the database 20 of the storage unit 14. That is, the recorded data is stored in the storage unit 14 as a file.

FIG. 2 illustrates an example of a data structure of the database 20. As shown in FIG. 2, the database 20 stores, as a record, a phone number (of a party on the other side), a data name (filename) of the recorded data, a title, a time delimiting point, and a keyword. That is, the MFD 10 stores a phone number (of a party on the other side), a data name (filename) of the recorded data, a title, a time delimiting point, and a keyword while associating a phone number (of a party on the other side), a data name (filename) of the recorded data, a title, a time delimiting point, and a keyword with respect to each other in the storage unit 14. The title means a keyword related to the entire recorded data.

After recording the telephone communication, the MFD 10 creates a file of the recorded data and registers the file in the database 20. The MFD 10 associates a title with the entire recorded data, and registers the recorded data and the title in the database 20. The MFD 10 also has a function of registering the recorded data while associating a plurality of time delimiting points with the recorded data. The time delimiting point is data for specifying a time on the recorded data.

A part on the recorded data can be specified by two continuous time delimiting points. The MFD 10 also has a function registering the recorded data in the database 20 while associating a keyword with partial recorded data (i.e., a part of the recorded data) specified by time delimiting points.

In the example shown in FIG. 2, the recorded data "DATA_1" storing the telephone communication with the user "TEL_1" and the recorded data "DATA_2" storing the telephone communication with the user "TEL_2" are registered in the database 20. The recorded data "DATA_1" is associated with the title "TITLE_1". In the recorded data "DATA_1", three time delimiting points "TIME_1", "TIME_2" and "TIME_3" are set. Although not shown in FIG. 2, a time delimiting point "TIME_0" is set at the top (at a top on the time base) of the recorded data "DATA_1". The time delimiting point at the top of the recorded data is set automatically by the MFD 10 at the start of recording of telephone communication. "TIME_3" is a time delimiting point set at the end (i.e., at the end on the time base) of the recorded data "DATA_1". The MFD 10 adds a last time delimiting point to the recorded data at the end of the telephone communication.

To the time delimiting point "TIME_1", a keyword "KWD_1" is assigned. Similarly, keywords "KWD_2" and "KWD_3" are assigned to the delimiting points "TIME_1" and "TIME_2", respectively. In other words, the partial recorded data specified by two time delimiting points "TIME_0" and "TIME_1" is associated with the keyword "KWD_1", and the partial recorded data specified by two time delimiting points "TIME_1" and "TIME_2" is associated with the keyword "KWD_2". Further, the partial recorded data specified by two time delimiting points "TIME_2" and "TIME_3" is associated with the keyword "KWD_3". It is understood that keywords are assigned to the recorded data "DATA_2" in a similar manner.

Figure 3:
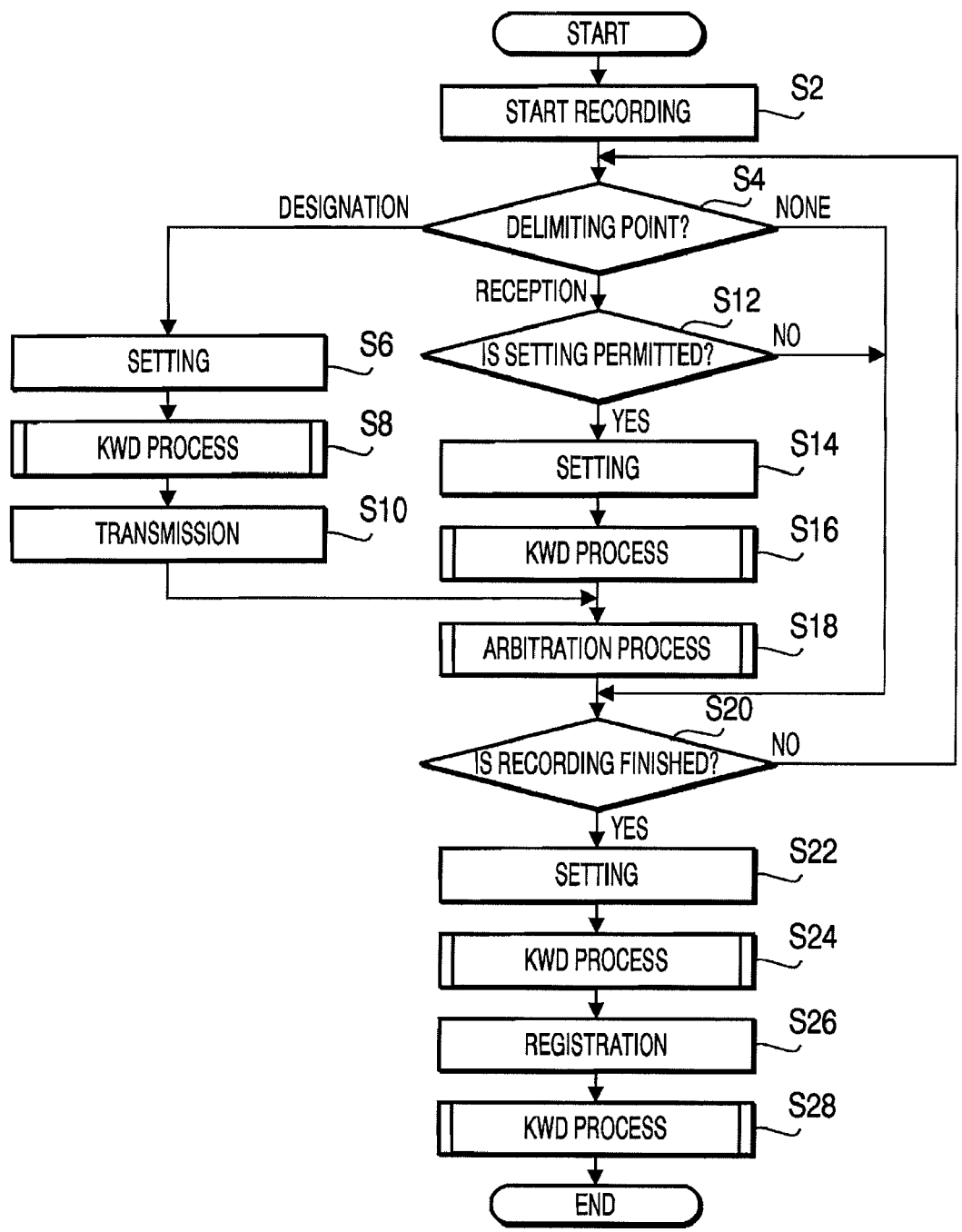
FIG. 3 is a flowchart illustrating a recording process executed on the multifunction device.

The MFD 10 is able to set a time delimiting point designated by the user of the MFD 10 or the user of the MFD 50 to the recorded data being recorded during the telephone communication while recording the telephone communication. In the following, operation of the MFD 10 is explained for the case where telephone communication between the user of the MFD 10 and the user of the MFD 50 is recorded. FIG. 3 is a flowchart illustrating a recording process executed on the MFD 10. A process similar to the recording process shown in FIG. 3 is also executed on the MFD 50.

When a connection is established, the MFD 10 (i.e., the CPU 12) starts recording telephone communication (step S2). When starting the recording, the MFD 10 secures a new record for recording the telephone communication in the database 20. In this case, a phone of the party on the other side (i.e., the user of the MFD 50) is registered in the new record.

The MFD 10 accepts designation of a time delimiting point from the MFD 50. Alternatively, the MFD 10 receives a time delimiting point from the MFD 50 (step S40). When the user wants to set a time delimiting point during the telephone communication, the user presses a predetermined key on the console 22. Then, the MFD 10 designates a time (i.e., a time elapsed from the start of the telephone communication) when the user presses the predetermined key, as a time delimiting point. That is, when the time delimiting point is designated by the user (S4: Designation), the MFD 10 sets the designated time delimiting point in the recorded data being recorded (step S6). More specifically, the MFD 10 registers the newly designated time delimiting point in the new record.

Next, the MFD 10 executes a keyword process in which a keyword is related to the designated time delimiting point (step S8). In FIG. 3, "KWD" means a keyword. The keyword process is explained later. Then, the MFD 10 transmits the designated time delimiting point and the keyword related in step S8 to the MFD 10 (i.e., the party on the other side) (step S10).

Hereafter, transmission and reception of the time delimiting point are explained. Each of the MFDs 10 and 50 is able to transmit and receive sound and digital data concurrently. Such concurrent transmission and reception of sound and digital data can be achieved, for example, with technology of a voice modem. The MFD 10 transmits time data indicating the time delimiting point (i.e., data indicating elapsed time from the start of recordation) accepted from the user to the MFD 50. In this case, the MFD 10 may use an internal timer (not shown) to measure the elapsed time. Then, the MFD 50 recognizes the received time data as a time delimiting point received from the MFD 10.

As described above, the MFD 50 executes substantially the same process as the recording process shown in FIG. 3. Therefore, when the MFD 50 accepts designation of a time delimiting point from the user of the MFD 50, the MFD 50 transmits the time delimiting point and an associated keyword to the MFD 10. When the MFD 10 receives the time delimiting point and the keyword from the MFD 50 (S4: Reception), control proceeds to step S12.

In this case, the MFD 10 displays a message indicating reception of a time delimiting point from the MFD 50 on the display 24, and further displays a message inquiring of the user about whether to set the time delimiting point received from the MFD 50 on the display 24. If the user accepts setting of the received time delimiting point (S12: YES), the MFD 10 sets the received time delimiting point to the recorded data being recorded as in the case of step S6 (step S14). That is, in step S14 the MFD 10 sets the received time delimiting point to the recorded data being recorded in response to the fact that the user accepts setting the received time delimiting point to the recorded data being recorded (S12: YES).

Next, the MFD 10 executes the keyword process (step S16). If the user does not accept setting the received time delimiting point to the recorded data being recorded (S12: NO), the MFD 10 discards the recorded data, and waits for next designation of a time delimiting point or next reception of a time delimiting point until the telephone communication finished (i.e., until the recordation finished) (S20: NO).

If the MFD 10 has set the designated time delimiting point (step S6) or the MFD 10 has set the received time delimiting point (step S14), the MFD 10 executes the arbitration process (step S18). In the arbitration process, one of the designated time delimiting point and the received time delimiting point is cancelled if the designated time delimiting point and the received time delimiting point are set within a predetermined tame range. The arbitration process is explained later.

When the recordation is finished (step S20: YES), the MFD 10 automatically sets a time delimiting point at the end of the recorded data (step S22). Then, the MFD 10 executes the keyword process which is the same as that in step S8 (step S24). Next, the MFD 10 stores the recorded data as a file, and registers the file in the database 20 (step S26). Then, the MFD 10 executes the keyword process again (step S28).

Figure 4:
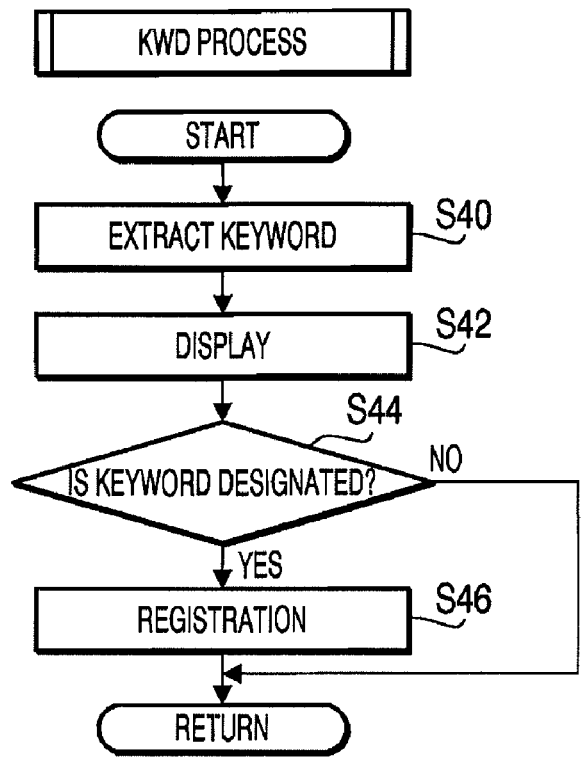
FIG. 4 is a flowchart illustrating a keyword process.

The keyword process will now be explained with reference to FIG. 4. FIG. 4 is a flowchart illustrating the keyword process. The MFD 10 searches past records registered in the database 20 for a record in which the phone number of the party with which the current connection is established. Then, the MFD 10 extracts a keyword registered in the searched record (step S40). That is, the MFD 10 extracts, from the database 20, a keyword associated with the past recorded data recording telephone communication with the party with which the current telephone communication is established. The MFD 10 displays the extracted keyword on the display 24 (step S42). In this case, the user is able to select a keyword to be associated with the time delimiting point set in step S6 or S14, from among the displayed keywords. Then the MFD 10 designates the keyword selected by the user (step S44).

Then, the MFD 10 registers the designated keyword in the database 20 while associating the designated keyword with the time delimiting point set in step S6 or S14. That is, a new record is secured in the database 20 in step S2, a time delimiting point is newly set to the new record in step S6 or S14, and the keyword is assigned to the newly set time delimiting point in step S46. The keyword associated with the time delimiting point means a keyword associated with partial recorded data specified by the newly set time delimiting point.

When the keyword is received together with the time delimiting point from the MFD 50 in step S4, the received keyword is also displayed with the keyword extracted in step S40 (step S42). In this case, the received keyword may be displayed such that the received keyword (i.e., the keyword set by the party on the other side) can be easily be identified by the user of the MFD 10. For example, the received keyword may be displayed on the top edge part of the display 24.

The keyword process executed in step S28 is slightly different from the keyword process executed in steps S8, S16 and S24. In the following, the keyword process executed in step S28 is explained. In step S40, the MFD 10 extracts, as a keyword, a title associated with the recorded data in addition to the keyword associated with the time delimiting point from the database 20. In step S46, the MFD 10 registers the designated keyword as the title of the recorded data. That is, the keyword process in step S28 is executed such that the keyword is related to the entire recorded data in place of relating the keyword to the time delimiting point (i.e., partial recorded data).

Hereafter, the arbitration process is explained. In the arbitration process, one of the designated time delimiting point and the received time delimiting point is cancelled if the time interval between the designated time delimiting point and the received time delimiting point is within a predetermined threshold. In this case, "cancel" means to delete one of the time delimiting points from the database 20. Whether to delete the designated time delimiting point or the received time delimiting point is determined depending on the mode of the MFD 10. More specifically, the MFD 10 has a priority mode and a non-priority mode. The priority mode is a mode for maintaining the designated time delimiting point and canceling the received time delimiting point. The non-priority mode is a mode for maintaining the received time delimiting point and canceling the designated time delimiting point. Switching of the modes is designated by the user through the consoled 22.

Figure 5:
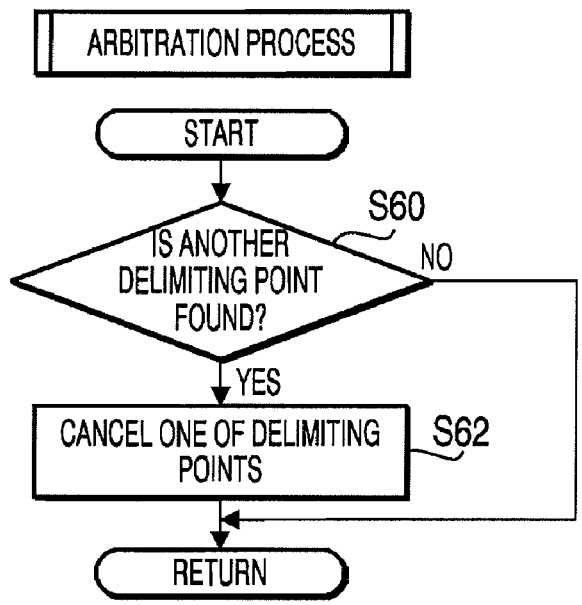
FIG. 5 is a flowchart illustrating an arbitration process.

FIG. 5 is a flowchart illustrating the arbitration process. As described above, the arbitration process is executed when one of the designated time delimiting point and the received time delimiting point is newly set. First, the MFD 20 refers to the database 20 to judge whether another time delimiting point (past time delimiting point) which has set within a predetermined past time range (a time threshold; e.g., past ten seconds) defined from the time at which the new time delimiting point is found in the database 20 (step S60). If another time delimiting point is found (S60: YES), the MFD 10 cancels one of the newly set time delimiting point and another past time delimiting point found in step S60 (step S62). In this case, the MFD 10 cancels the received time delimiting point when the MFD 10 is in a priority mode. On the other hand, the MFD 10 cancels the designated time delimiting point when the MFD 10 is in a non-priority mode.

It is understood that the arbitration process is advantageous particularly in the case where the user (the party) on the other side designates (transmits) a time delimiting point at approximately the same time when the user of the MFD 10 designates a time delimiting point or in the case where the user of the MFD 10 designates a time delimiting point at approximately the same time when the user (party) on the other side designates (transmits) a time delimiting point.

When both of the user of the MFD 10 and the user of the MFD 50 designate time delimiting points within a predetermined tame range, the MFD 10 may display, on the display 24, a selection screen for allowing the user to select one of the time delimiting point designated by the MFD 10 and the time delimiting point designated by the MFD 50 to be related to the recorded data.

If both of the two time delimiting points falling within the predetermined time range are the designated time delimiting points (designated by the MFD 10) or if both of the two time delimiting points falling within the predetermined time range are the received time delimiting points (received from the MFD 50), the MFD 10 may display, on the display screen 24, a selection screen for allowing the user to selected one of the two time delimiting points.

In the following, advantages of the MFD 10 are described.

(1) The MFD 10 is able to record telephone communication, and to set a time delimiting point designated by the user of the MFD 10 or a time delimiting point received from the party on the other side to the recorded data. The MFD 10 also has the function of transmitting the time delimiting point designated by the user to the party on the other side. Through these processes, it becomes possible to set common time delimiting points to the recorded data recorded on the user's own device and to the recorded data recorded on a device of the party on the other side.

(2) The MFD 10 is able to associates a keyword with a time delimiting point. By thus associating a keyword with a time delimiting point, the user is able to easily search for partial recorded data specified by the time delimiting point.

(3) The MFD 10 associates a phone number of the party on the other side with the recorded data. By referring to the phone number, the MFD 10 displays keywords associated with the past recorded data of the communication with the current party on the other side, as keywords for the time delimiting point of the new recorded data. Through these processes, the user is allowed to select a desired keyword from among the keywords associated with the past recorded data.

(4) If continuous two time delimiting points fall within the predetermined time range, one of the time delimiting points is cancelled. In this case, one of the designated time delimiting point and the received time delimiting point. Through these processes, it becomes possible to prevent a plurality of time delimiting points from being set within a relatively short time range.

The MFD 10 is able to associate a keyword with the entire recorded data in response to termination of the recording. Through the process, it becomes possible to easily search the entire recorded data in addition to the partial recorded data.

Hereafter, a search process executed on the MFD 10 is described. By operating the MFD 10, the user is able to search for desired recorded data or desired partial recorded data from a plurality of pieces of recorded data in the database 20.

Before starting the searching, the user operates the MFD 10 to designate one of the priority mode and the non-priority mode. Regarding the searching for the partial recorded data (hereafter, referred to as a partial recorded data search mode), the MFD 10 extracts the partial recorded data associated with an inputted keyword. On the other hand, regarding the searching for the entire recorded data (hereafter, referred to as an entire recorded data search mode), the MFD 10 extracts, from the database 20, the entire recorded data containing the partial recorded data associated with an inputted keyword. Then, the MFD 10 reproduces the extracted recorded data.

The difference between the partial recorded data search mode and the entire recorded data search mode is explained with reference to FIG. 2. In the following, it is assumed that the user inputs a keyword "KDW_1". In the partial recorded data search mode, the MFD 10 refers to the database 20, and specifies the time delimiting point "TIME_1" and "TIME_5" each of which is associated with the keyword "KWD_1". The MFD 10 displays, on the display 24, the partial recorded data existing within a time range of which end point is defined by the time delimiting point "TIME_1" in the recorded data "DATA_1", and the partial recorded data existing within a time range of which end point is defined by the time delimiting point "TIME_5" in the recorded data "DATA_1", as selectable data.

If the partial recorded data existing within the time range of which end point is defined by the time delimiting point "TIME_1", the MFD 10 reproduces the partial recorded data existing within the time range of which end point is defined by the time delimiting point "TIME_1".

In the entire recorded data search mode, the MFD 10 refers to the database 20, and displays, on the display 24, the recorded data "DATA_1" to which the time delimiting point "TIME_1" is set and the recorded data "DATA_2" to which the time delimiting point "TIME_5" is set as selectable data. If the recorded data "DATA_1" is selected, the MFD 10 reproduces the entire recorded data "DATA_1". In the entire recorded data search mode, the user may inputs, as a keyword, the title associated with the recorded data.

Although the present invention has been described in considerable detail with reference to certain preferred embodiments thereof, other embodiments are possible.

For example, the above described processes executed on the MFD 10 may be distributed over the MFD 10 (a first device) and a second device connected to the first device via a network. As an example, the processes described in the embodiment may be achieved by the cooperation between the MFD 10 and a server connected to the MFD 10 via a network.

The MFD 10 may execute the following steps in place of the keyword process in step S16. That is, when the user permits the setting of the time delimiting point in step S12, the MFD 10 may associate the time delimiting point received in step S4 with the keyword received in step S4.

In the above described embodiment, the MFD 10 transmits the time delimiting point to the party on the other side, as time data. However, if the device of the party on the other side is not able to transmit digital data concurrently with sound, the MFD 10 may transmit a tone signal as information indicating the time delimiting point. More specifically, in the case, the MFD 10 operates as follows. The MFD 10 transmits a predetermined tone signal to the MFD 50 at the time when the recordation reaches a time delimiting point designated by the user. The predetermined tone signal represents the time delimiting point. The device on the other side (the MFD 50) sets the point on the recorded data corresponding to the received timing, as a time delimiting point transmitted from the MFD 10. That is, in this case, the MFD 50 (and the MFD 10) has a monitoring unit to monitor reception of the tone signal. When the monitoring unit detects the tone signal, the MFD sets the time when the tone signal is received as a time delimiting point. By thus using the tone signal which is defined in the technical field of the public network, it becomes possible to achieve the recorded data management device (MFD) at low cost.

In the keyword process (S8, S16 or S24), the keyword may be inputted by the user through the console.

What is claimed is:

1. A device for managing recorded data, comprising:
   a recording unit configured to record a telephone communication between the device and an external device;
   a selectable key;
   a designation unit configured to designate a time delimiting point when the selectable key is selected, the time delimiting point to be set to recorded data being recorded by the recording unit;
   a receiving unit configured to receive a signal indicating a time delimiting point from the external device of a party on the other side of the telephone communication; and
   a setting unit configured to set the designated time delimiting point designated through the designation unit and the received time delimiting point received from the external device to the recorded data.

2. The device for managing recorded data according to claim 1, further comprising a transmission unit configured to transmit a signal indicating the designated time delimiting point to the external device.

3. The device for managing recorded data according to claim 1, further comprising an accepting unit configured to accept an allowance command for allowing setting of the received time delimiting point to the recorded data,
   wherein the setting unit sets the received time delimiting point to the recorded data in response to a fact that the accepting unit accept the allowance command.

4. The device for managing recorded data according to claim 1, wherein the setting unit is configured to cancel one of the designated time delimiting point and the received time delimiting point if an time interval between a time indicated by the time delimiting point and a time indicated by the received time delimiting point is smaller than a predetermined time period.

5. The device for managing recorded data according to claim 2, wherein:
   the transmission unit transmits a tone signal as the signal indicating the time delimiting point; and
   the setting unit is configured such that when the receiving unit receives the time signal, the setting unit sets the received time delimiting point to the recorded data at a position on the recorded data corresponding to a time when the tone signal is received.

6. The device for managing recorded data according to claim 2, wherein:
   the signal transmitted by the transmission unit contains time data for specifying the time delimiting point; and
   the setting unit is configured to set the received time delimiting point to the recorded data based on the time data received through the receiving unit.

7. The device for managing recorded data according to claim 2, further comprising a keyword designation unit configured to designate a keyword, wherein:
   the setting unit stores the recorded data while associating the designated keyword designated through the keyword designation unit with partial recorded data of which end point is defined by the designated time delimiting point; and
   the transmission unit transmits the signal indicating the designated time delimiting point, to the external device, together with the designated keyword designated through the keyword designation unit.

8. The device for managing recorded data according to claim 1, wherein:
   the signal received by the receiving unit further indicates a keyword; and
   the setting unit stores the recorded data and a received keyword received by the receiving unit while associating the received keyword with partial recorded data of which end point is defined by the received time delimiting point.

9. The device for managing recorded data according to claim 1, wherein the setting unit is configured such that in response to end of recording of the telephone communication, the setting unit stores the recorded data formed of one or more of particle recorded data while associating a keyword to the recorded data.

10. The device for managing recorded data according to claim 1, further comprising a first search unit configured to search for partial recorded data associated with an inputted keyword.

11. The device for managing recorded data according to claim 1, further comprising a second search unit configured to search for entire recorded data containing partial recorded data associated with an inputted keyword.

12. A method to be implemented on a device for managing recorded data, comprising the steps of:
   recording a telephone communication between the device and an external device;
   receiving a selection of a selectable key at the device;
   designating a time delimiting point when the selection of the selectable key is received, the time delimiting point to be set to recorded data being recorded;
   receiving a signal indicating a time delimiting point from the external device of a party on the other side of the telephone communication; and
   setting the designated time delimiting point and the received time delimiting point received from the external device to the recorded data.

13. The method according to claim 12, further comprising the step of transmitting a signal indicating the designated time delimiting point to the external device.

14. The method according to claim 12, wherein the step of setting comprises the step of canceling one of the designated time delimiting point and the received time delimiting point if an time interval between a time indicated by the time delimiting point and a time indicated by the received time delimiting point is smaller than a predetermined time period.

15. The method according to claim 13, further comprising the step of designate a keyword, wherein:
   in the step of setting, the recorded data is stored while associating the designated keyword with partial recorded data of which end point is defined by the designated time delimiting point; and
   in the step of transmitting, the signal indicating the designated time delimiting point is transmitted to the external device, together with the designated keyword.

16. A computer readable medium having computer readable instruction stored thereon, which, when executed by a processor of a device for managing recorded data, configures the processor to perform the steps of:

recording a telephone communication between the device and an external device;

receiving a signal indicating that a selectable key at the device is selected;

designating a time delimiting point when the selectable key is selected, the time delimiting point to be set to recorded data being recorded;

receiving a signal indicating a time delimiting point from the external device of a party on the other side of the telephone communication; and setting the designated time delimiting point and the received time delimiting point received from the external device to the recorded data.

17. The computer readable medium according to claim 16, wherein the method further comprises the step of transmitting a signal indicating the designated time delimiting point to the external device.

18. The computer readable medium according to claim 16, wherein the step of setting comprises the step of canceling one of the designated time delimiting point and the received time delimiting point if an time interval between a time indicated by the time delimiting point and a time indicated by the received time delimiting point is smaller than a predetermined time period.

19. The computer readable medium according to claim 17, wherein:

the method further comprises the step of designate a keyword;

in the step of setting, the recorded data is stored while associating the designated keyword with partial recorded data of which end point is defined by the designated time delimiting point; and in the step of transmitting, the signal indicating the time delimiting point designated by the user is transmitted to the external device, together with the designated keyword.

20. In combination, a first device and a second device, the first device comprising:

a first designation unit configured to designate a time delimiting point; and a transmission unit configured to transmit a signal indicating the designated time delimiting point to the second device, the second device comprising:

a recording unit configured to record a telephone communication between the first device and the second device;

a selectable key;

a second designation unit configured to designate a time delimiting point when the selectable key is selected, the time delimiting point to be set to recorded data being recorded by the recording unit;

a receiving unit configured to receive the signal from the first device; and a setting unit configured to set the designated time delimiting point designated through the second designation unit and the received time delimiting point received from the first device to the recorded data.

* * * * *